April 9, 1929.  F. W. DANBERG  1,708,664
ARTICLE DELIVERY MECHANISM
Filed June 14, 1922   3 Sheets-Sheet 1
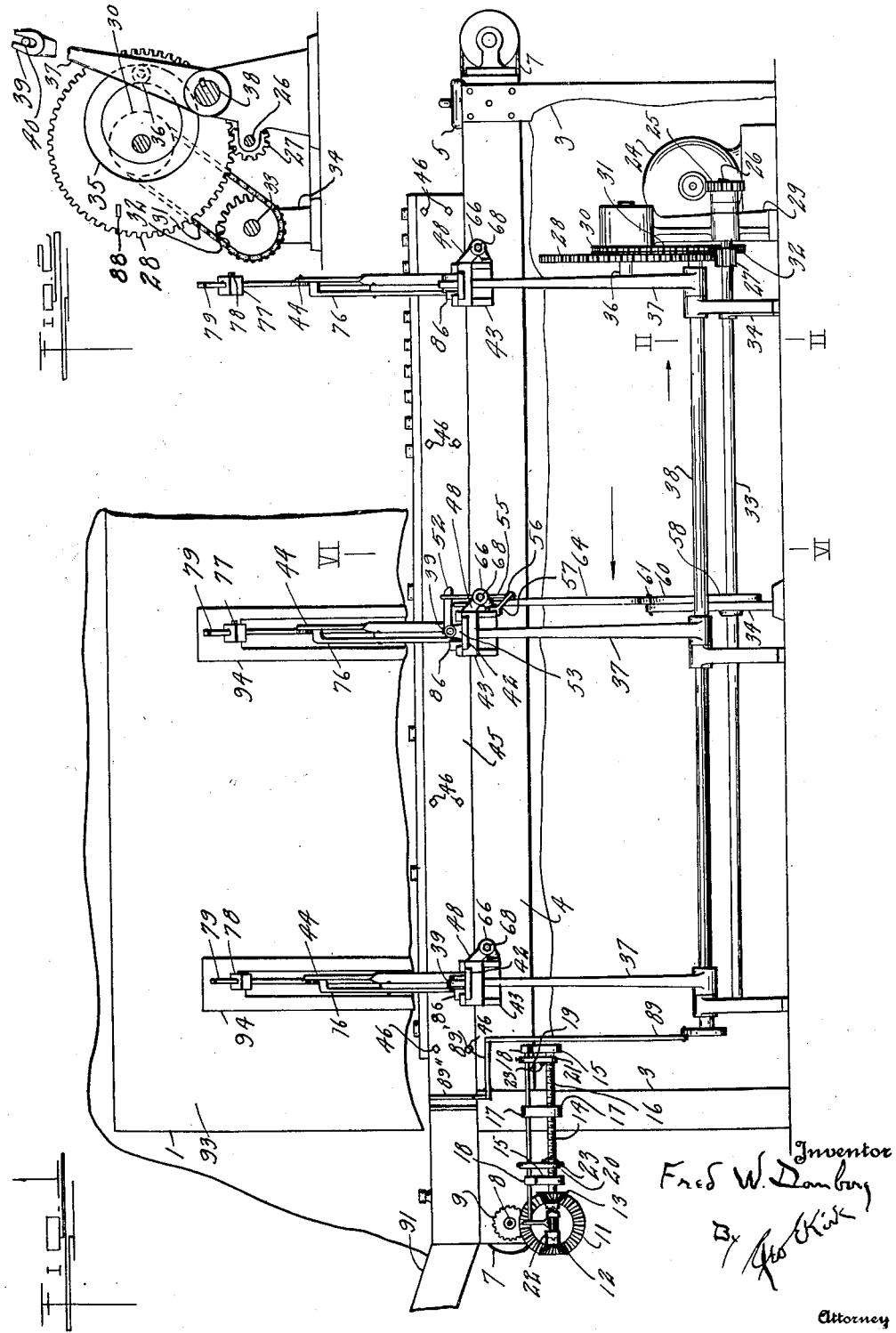

April 9, 1929.   F. W. DANBERG   1,708,664
ARTICLE DELIVERY MECHANISM
Filed June 14, 1922   3 Sheets-Sheet 2
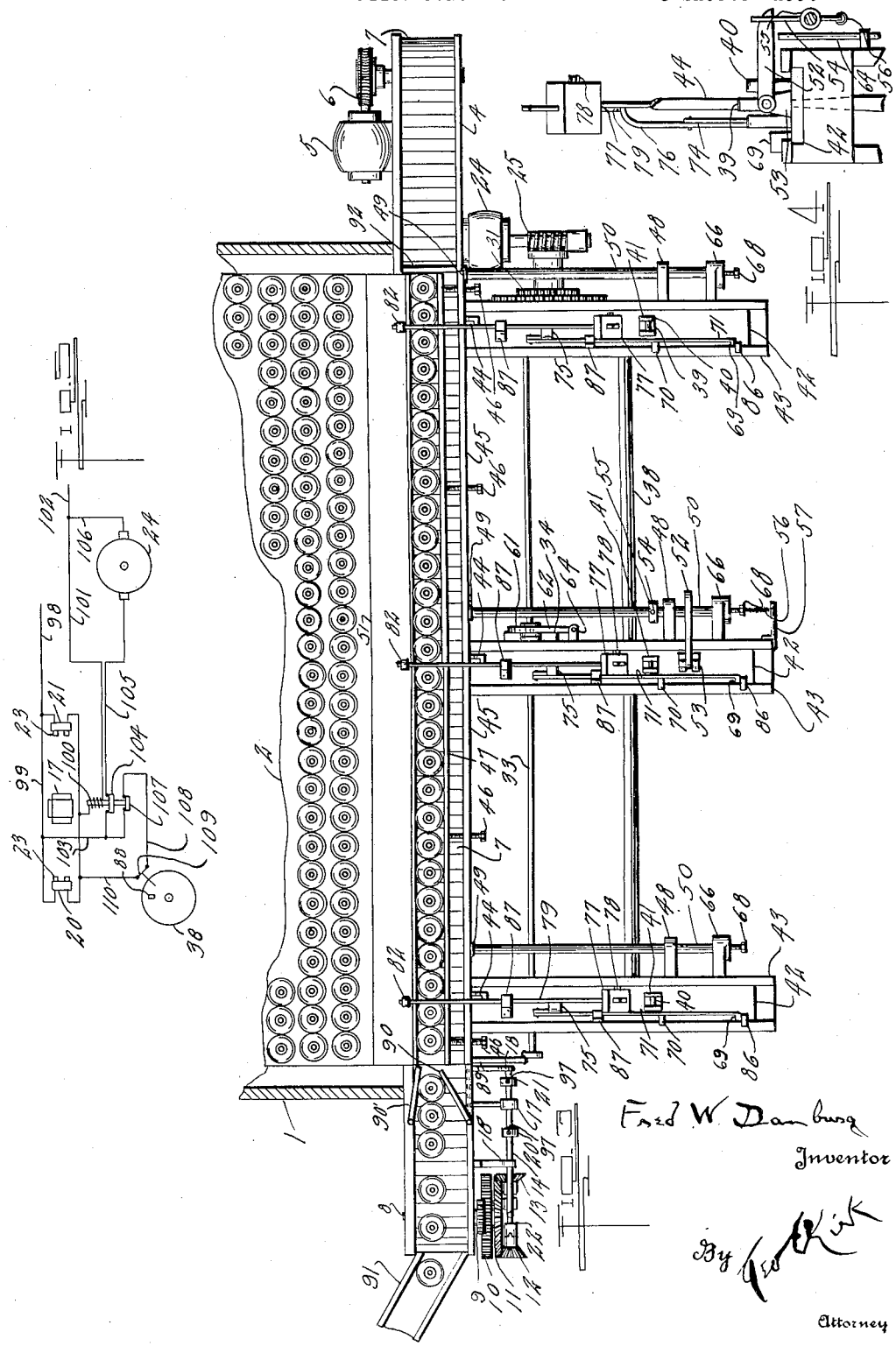

April 9, 1929. F. W. DANBERG 1,708,664
ARTICLE DELIVERY MECHANISM
Filed June 14, 1922 3 Sheets-Sheet 3
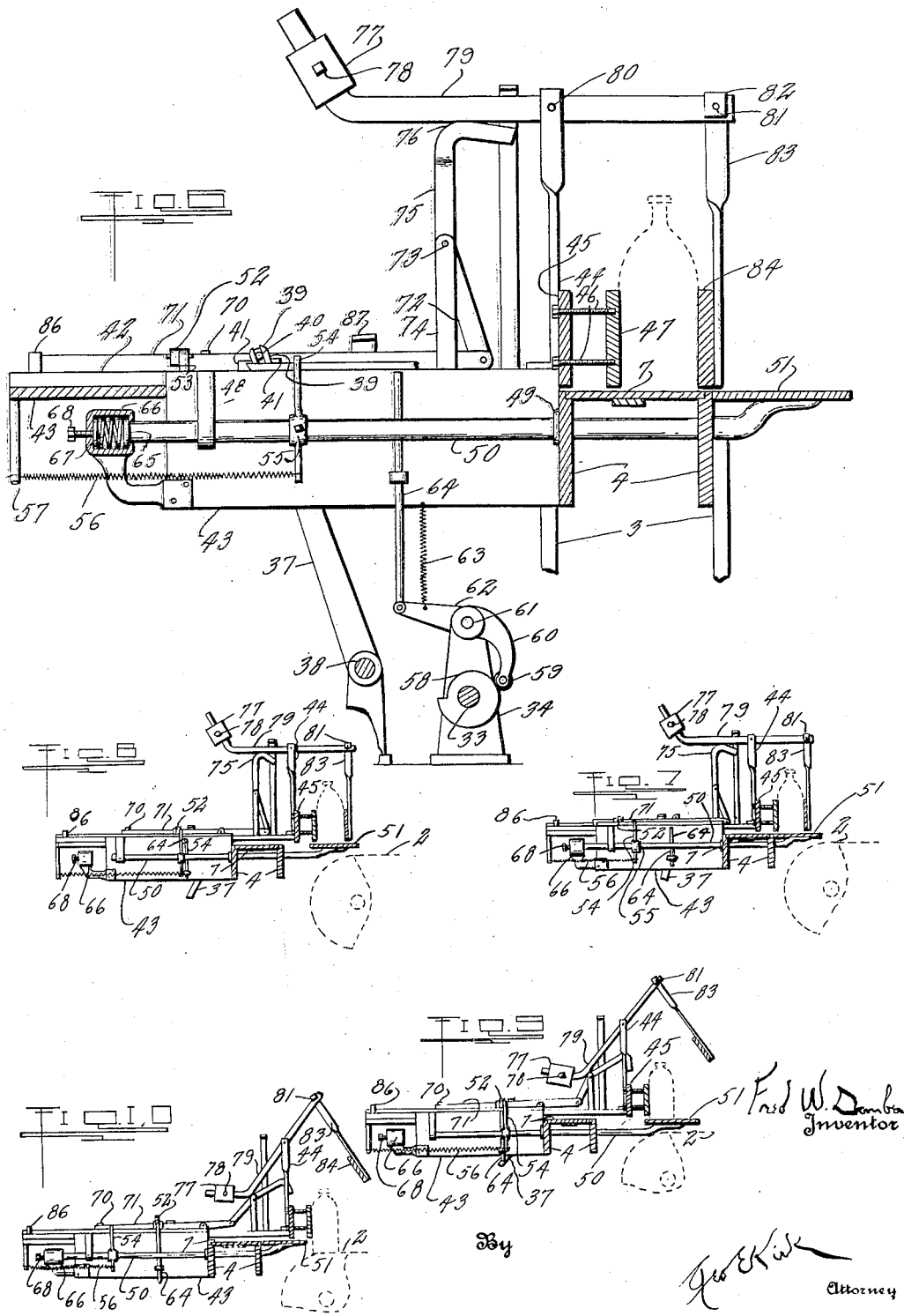

Patented Apr. 9, 1929.

1,708,664

UNITED STATES PATENT OFFICE.

FRED W. DANBERG, OF TOLEDO, OHIO.

ARTICLE-DELIVERY MECHANISM.

Application filed June 14, 1922. Serial No. 568,122.

This invention relates to the handling or transferring of articles as bottles, jars and other articles of different shapes and sizes.

This invention has utility in connection with leer charges from glass forming machines serving as article delivery mechanisms.

Referring to the drawings:—

Fig. 1 is a side elevation of the article delivery mechanism as a leer charging device of this invention in position against the end of a leer, parts being broken away;

Fig. 2 is a detail view of a type of control for the charger of Fig. 1 on the line II—II, Fig. 1;

Fig. 3 is a plan view of the apparatus as shown in Fig. 1, parts being broken away;

Fig. 4 is a detail view, somewhat enlarged, of guide and control features for the charger;

Fig. 5 is a wiring diagram of the control circuit;

Fig. 6 is a section on the line VI—VI Fig. 1, looking in the direction of the arrow, showing the pusher or leer charger in initial position.

Fig. 7 is a fragmentary view on a reduced scale, showing the charger or pusher of Fig. 6 in second position or where the ware has been shifted from the conveyor to the support;

Fig. 8 is a view similar to Fig. 7, showing the next position of the leer charging device where the support is shifted to position over the leer conveyor;

Fig. 9 is a showing of the leer charger after the guard has been withdrawn and the ware is being upheld in position ready for dropping upon the leer conveyor; and Fig. 10 is a view of the leer charging device where the support is now shifted so that the charging device may be withdrawn without tilting the ware as deposited upon the leer.

Leer 1 is an annealing oven for glassware, and is shown as having therein an endless conveyor 2 continuously driven. Transversely across the charging end of this leer 1 is a pair of supports 3 carrying frame 4. Mounted on this frame 4 is motor 5 having speed reduction gearing 6 for driving endless conveyor 7 herein shown as forming a continuous table by its endless series of plates.

Remote or supply end of this conveyor 7 has its shaft 8 carrying pinion 9 in mesh with gear 10 having beveled gear portion 11 with which beveled gears 12, 13, are in mesh in opposing relation. These beveled gears 12, 13, are loosely mounted on shaft 14. This shaft 14 is mounted in bearings 15. The shaft 14 between the bearings 15 has threaded portion 16 on which is mounted traveling nut 17. Mounted in bearings 18 above the bearings 15 is reciprocable rod 19. This rod 19 is reciprocated due to the nut 17 traveling in one direction to abut stop 20 carried by the rod 19, and traveling in the other direction of the rotation of the shaft 14 to abut stop 21 and thereby draw the rod 19 in the opposite direction. This rod 19 is connected to collar 22 splined upon the shaft 14 so that in one direction of shifting, that is, when the nut 17 strikes stop 20, the rod 19 is shifted so that the collar 22 is shifted to connect the gear 12 for driving the shaft 14 in one direction. As the rotation of this shaft 14 is continued, the nut 17 reverses its travel and comes into abutting relation with the stop 21 and in moving the stop 21 and with it the rod 19 pulls the clutch 22 out of engagement with the gear 12 and into driving relation with the gear 13 thereby reversing the direction of rotation of the shaft 14. The stop 20 as well as the stop 21 each carries a quick throw switch 23 which, as abutted by the nut 17 closes a circuit for driving motor 24.

The motor 24 is carried by the frame 3, 4, and has worm speed reduction gearing 25 for driving shaft 26 carrying pinion 27 in mesh with gear 28. Bracket 29 not only supports the shaft 26, but the gear 28. This gear 28 on one side thereof, has belt pulley or sprocket wheel 30 connected by sprocket chain or belt 31 with sprocket 32 on shaft 33 mounted in bracket 34.

The opposite side of the gear 28 is provided with an eccentric or cam way 35 (Fig. 2) engaged by a wrist pin 36 carried by rock arm 37 mounted upon rock shaft 38. In a transfer device or leer charger of considerable extent, it is desirable that rock arms 37 be thrown in multiple and as herein disclosed such are keyed to the rock shaft 38 to rock therewith.

The upper or free ends of the rock arms 37 (Fig. 2) are provided with fork portions 39 to engage pins 40, each carried by a block 41 (Figs. 2, 3) on slide 42 reciprocable in fixed guide bracket 43 carried by the transfer device frame 4. Uprising from the slide 42 are standards 44 (Fig. 6) holding pusher bar backing member 45 which carries screws 46 which may adjust bar plate 47.

In the operation of this pusher or transfer device of the disclosure herein, the first arc of movement in the rocking of the arm 37 in shifting the slide 42 forces the pusher 47 against articles on the belt portion 7, to shift such articles laterally of this belt or conveyor 7 off this said conveyor. Guide brackets 48, 49, carried by the main bracket 43 serve to mount rod 50 terminally carrying support 51 on the opposite side of the conveyor belt 7 from the slide 42. In the first arc of travel of this rocker arm 37 and at the first period of movement of the slide 42, the bottles, jars or other articles on the conveyors 7 are accordingly pushed by the pusher bar 47 laterally off the conveyor 7 to rest upon the support 51.

When the slide 42 has shifted the pusher 47 so that the ware from the conveyor 7 is clear thereof and fully deposited upon the support 51, stop 52 (Figs. 3, 6) pivotally carried by bearing 53 on the slide 42 is in position to abut upstanding stem 54 carried by collar 55 locked to the rod 50. Accordingly, continuous movement of this slide 42 now results in thrusting the rod 50 through the bearings 48, 49, to carry the support 51 with the ware thereon, together with the pusher 47 moving in synchronism on one side of said ware. This thrusting forward of the support 51, with the ware pushed thereon by the pusher bar 47, is resisted, for the stem 54 has collar 55 connected by helical tension spring 56 extending to depending arm 57 carried by the fixed slide support 43.

The support 51 is shifted to position over the conveyor 2 in the leer 1, and is then withdrawn. To this end there is mounted on the shaft 33, adjacent one of the brackets 34 a cam 58 (Fig. 6) coacting with roller 59 for rocking arm 60 having fulcrum bearing 61 carried by the bracket 34. This arm 60 is part of a lever having a second arm 62 normally held by spring 63 for positioning the roller 59 against the cam 58. The rotation of this shaft 33 brings the cam 58 so that the roller 59 comes to the short radius position just as the slide 42 has brought the stop 52 over the plunger 64, and at once the spring 63 acts for thrusting or pulling upward plunger 64 which thrusts latch or stop 52 clear of the stem 54 (Fig. 4). The spring 56 under tension accordingly at once gets in its action in withdrawing or pulling the support 51 back to the starting position adjacent the conveyor 7 while the pusher 47 holds the ware in position to be dropped directly on the leer conveyor 2 as this support 51 is withdrawn from beneath the ware. In the recover stroke of the rod 50, the quick recover brings about a concussion and in its travel rearward has this concussion taken up by the rear end of the rod 50 hitting against plate 65 in housing 66 for compressing helical spring 67, the adjustment of which is effected by set screw 68.

Before the support 51 is withdrawn, the travel direction of the arms 37 is still forward in thrusting the slide 42. This continued movement of the slide 42 brings offset 69 of the bar 71 carried by the slide 42 to abut stop 70 carried by the frame 43. The bar 71 is connected by lever 72, upwardly extending to fulcrum 73. This fulcrum 73 is in bracket 74 carried by the slide 42 and upstanding from this slide 42. From this fulcrum 73 the lever 72 has upwardly extension 75 to cam portion 76. An adjustable counterweight 77 is adjusted in position by set screw 78 upon lever 79 having fulcrum 80 in upstanding bar 44. This lever 79 remote and on the opposite side from the counterweight 77 has pin 81 connected to overloop 82 of drop bar 83 having its lower portion carrying guide bar 84 parallel to the pusher bar 47. In starting position of this leer charging device, the bar 47 is on the opposite side of the conveyor 7 from the leer or discharging side of the conveyor 7. The guide bar 84 is lifted and the support 51 is then withdrawn while the ware is held from tipping by the pusher bar 47. Accordingly notwithstanding the quick withdrawal of the support 51, the ware is maintained in upright position in its slight distance of drop from the support 51 down on the conveyor 2 of the leer 1.

From the position as shown in Fig. 8, the further movement of the rocker arm 37 brings about the tilting of the lever 72, 75, and thereby permits the lowering of the cam 76 as to the lever 79 and permits the counterweight 77 to swing downward. This swinging downward of the counterweight 77 tilts the guard 84 upward and in a slightly inclined position with relation to the lever 79 as permitted by the loop over strap portion 82. This movement in a continuous forward travel of the slide 42 permits the rocking and upward lifting of the guide or guard 84 to clear the ware in return movement. The return movement or resetting of the leer charger starts thereafter as the rocker arms 37 follow the eccentric cam 35.

As the return movement of the slide 42 has progressed sufficiently so that the rocking guard 84 clears the ware deposited on the conveyor 2, stops 86 carried by the brackets 43 contact the lugs 69 and thus reverse the operation of the bar 71, the upward limit of which swinging of the bar 71 is restricted by loop over strap 87. This bar 71 is accordingly drawn back into the position for swinging the lever 72, 75, up under the lever 79 and for thereby resetting the lever 79 against the resistance of the counterweight 77 so that the rockable guard 84 is brought into position parallel to the pusher bar 47 as the pusher bar 47 has returned to position adjacent the conveyor 7.

As the shaft 33 continues to rotate, the cam 58 is so positioned that the spring 63 resets the plunger 64 thereby allowing return of the stop 52 to its initial position. Accordingly, as the continued travel of the gear 28 is effected through the cam 35 for bringing the pusher of the leer charging device back to starting position, it is important at this fully returned position to have the motor 24 cut out from driving operation and to this end a cut out member or pin 88 on the gear 28 strikes an arm of a switch to open the power circuit to the motor.

From the rock shaft 38 extends link 89 operating when the pusher bar 47 starts. This upwardly inclined link 89 engages horizontally extending arm 89′ of vertical shaft 89″ to shift check wing 90 into position toward adjustable wing 90′ to hold any ware which may be coming on the conveyor 7 away from the region of the pusher bar 47. This accordingly congests the coming ware back of this check wing 90 and this congestion may extend back onto supply ways 91. As soon as the cycle of operation of the transfer device is completed, the position of the shaft 38 is effective through the linkage 89 to release the check wings 90 so that the ware as held back on the continuously traveling conveyor 7 is released to move along with said conveyor. The limit of such travel is determined by timing as to the position of the drive device from the shaft 8 comprising the shaft 14, the nut 17, and stops 20, 21. When the conveyor 7, across the leer is full, the bottle as reaching the far side is held by fixed cross over stops 92 (Fig. 3).

There is accordingly provided in the mechanism of this disclosure an article delivery mechanism or leer charging device which may readily be placed in position beyond the end of the conveyor 2 in the end of the leer 1 and not as a part of the leer. The heat of the leer may be conserved by housing sections 93, 94, (Fig. 2) mounted above the leer charging frame 3, 4. If it be desired to make any repairs, adjustments or any other operations on the leer charger, it is not necessary to cool the leer and thus put the leer out of operation, but it is only necessary to remove the housing sections 93, 94, and then shift the support 3, carrying the frame 4 away from the open or charging end of the leer and make such repairs or substitutions as may be found desirable. The housing sections may even be placed in position to close the leer while the charger is removed.

This leer charging device is one which may have maximum capacity in the speed of handling separate articles of ware and it is further one in which the ware may be handled which does not involve shifting or pushing of the ware to any great extent. In fact the shifting of the ware on the conveyor 7 is only the width of the ware and the final dropping of the ware by the pulling of the support 51 out from under the ware is merely a dropping down and that is such a short distance as not to disturb even the finest grade of ware even though it be rather soft. There is accordingly herein disclosed a simple structure of general application which may be readily adapted to a great capacity of output. Furthermore, a wide range or variety of sizes and shapes may be handled with a minimum of adjustments to be made as to the timing for the number of articles to be supplied as to the relation of the supply thereto while as to the width of the article, such adjustments are made by adjusting the pusher bar
47. The stops 20, 21, are adjustable by set screws 97 to vary the timing for charge shifting, while the drive rate of the conveyor 7 may be at a rate adequate to deliver the ware from even several sources of supply. As the ware is shifted relative to its support, practically only the distance of the article diameter, this means there may be very rapid handling of the articles, and when such is glass ware to a leer, the glass may be quite soft and still not be marred. The adjustment of the respective stops 20, 21, by the set screws 97 determines the travel distance of the conveyor 7 between the intervals of leer charging action of the device of this disclosure. An electrical control for this charging is shown in Fig. 5. Electric power current is supplied by line 98 and with the contact 17 at the switch stop 21, such current may flow by line 99, through solenoid coil 100 and line 101 to complete the circuit to power line 102. From the power line 98 extends branch line 103, which with the solenoid coil 100 energized, is connected by way of contact 104 to line 105 extending to the motor 24, and thence by line 106 to the line 102. The motor 24 is thus energized and operates the leer charger through a cycle of operations. The motor 5 is continuous in its operation, and the automatic reversal of the shaft 14 in withdrawing the contact 17 from the stop 21 is not effective for stopping the motor 24 until the cycle of operations is completed for contact 107 connects the line 103 to line 108, past switch 109 to line 110 thereby to maintain the coil 100 energized until the pin 88 on the gear 38 opens such solenoid circuit upon the completion of the leer charging operation cycle. When the contact 17 reaches the stop 20, the solenoid coil 100 is again energized for a repetition of the cycle of the leer charging operation. As the motor 24 starts with its solenoid current connected through a stop, the gear 38 is turned to allow the switch 88 to clear before the contact at the stop 20 or 21 is opened.

What is claimed and it is desired to secure by Letters Patent is:—

1. A pair of continuously traveling conveyors having straight portions, said straight portion of one of said conveyors extending transversely and entirely laterally of said straight portion of the other conveyor, and intermittent transfer means therebetween embodying movable members engaging articles while said articles are each sustained on and parallel to one conveyor, a movable support upon which such articles are simultaneously shifted from said one conveyor by the members to be sustained independently of both conveyors, means for shifting said support relatively to one of said members whereby such articles from the support are deposited on the other conveyor by shifting of said support relatively to one of said members, and an actuator having connections effecting uniform movement of said members throughout their article engaging extent for effecting uniform travel of each article in its transfer movement.

2. First and second continuously traveling conveyors having straight portions, one extending transversely of the other, and transfer means between said straight portions of the conveyors embodying a movable support adjacent the first conveyor and parallel thereto, and means at the first conveyor for simultaneously shifting a full charge of articles from the first conveyor to the support and thereafter by a separate operation effecting a shifting of the support and individually depositing the articles from the support on to the second conveyor.

3. First and second continuously traveling conveyors having straight line portions, one extending transversely of the other, transfer means between straight line portions of the conveyors embodying a support adjacent the first conveyor and parallel thereto, means for shifting articles from the first conveyor to the support, and means for withdrawing the support to deposit the articles from the support upon the second conveyor.

4. First and second endless conveyors, transfer means therebetween embodying a support adjacent the first conveyor and parallel thereto, and means for shifting articles from the first conveyor to the support, shifting the support with the articles over the second conveyor and withdrawing the support to deposit the articles on the second conveyor.

5. A transfer device for articles embodying a support, and means for charging articles upon the support lengthwise of one side thereof, shifting the charged support in the direction of charging travel of said articles thereto, holding the charge of articles, and withdrawing the support in the reverse direction of the charge of articles thereupon for effecting removal therefrom of the articles.

6. A transfer device embodying a support, and a movable article positioner for shifting articles in charging such upon the support and holding the articles as the support is shifted from under the articles for discharging articles therefrom.

7. The combination between a supply and a receiver, of a movable article positioner for shifting articles from the supply, charging such upon the support and holding the articles as the support is shifted from under the articles for discharging articles therefrom to the receiver, and driving means for shifting the positioner from the supply to the support, then shifting the support and positioner away from the supply, then returning the support to the supply and thereafter returning the positioner to its original position.

8. A driven conveyor, an article supporting shiftable transfer device for receiving articles directly from the conveyor, a mounting for the device permitting shifting of the device toward and from the conveyor, and movable means operable from the conveyor for controlling the operation of the device.

9. A driven conveyor, an article supporting shiftable transfer device for receiving articles directly from the conveyor, a mounting for the device permitting shifting of the device toward and from the conveyor, a drive for the transfer device, and movable means operable from the conveyor for controlling the operation of the drive for the transfer device.

10. A driven conveyor, an article supporting shiftable transfer device for receiving articles directly from the conveyor, a mounting for the device permitting shifting of the device toward and from the conveyor, a drive for the transfer device, and movable means operable from the conveyor for intermittently actuating the transfer device drive.

11. A transfer device embodying a support for receiving a row of articles in a straight line, a conveyor carrying a row of articles in a straight line alongside said support, means for effecting transfer of said row of articles from the conveyor to the support, and means for pulling the support at right angles to said row out from under the articles.

12. A conveyor, a transfer device comprising movable members for shifting articles from the conveyor and a support for receiving articles, means for pulling the support out from under the articles, and a guard beyond the means and support as to which the pulling means is movable for holding the articles from tipping as the pulling means is operated.

13. A conveyor, a transfer device comprising movable members for shifting articles from the conveyor and a support for receiving articles, means for pulling the support out from under the articles, and a rockable guard beyond the means and support as to which the pulling means is movable for holding the articles from tipping as the pulling means is operated.

14. A conveyor, a transfer device comprising movable members for shifting articles from the conveyor and a support for receiving articles, means adjustable to vary the effective width of the support, and means for pulling the support out from under the articles.

15. A supply conveyor, and an article supporting shiftable transfer device including a platform, means for shifting the platform toward and from the conveyor, and a pusher transversely of the conveyor and comprising an actuating bar and an opposing guide bar, each movable relatively to the platform, said actuating bar being operable to shift an article from the conveyor to said shiftable platform.

16. A supply conveyor, and an article supporting shiftable transfer device including a platform, means for shifting the platform toward and from the conveyor, and a pusher transversely of the conveyor and comprising an actuating bar and a rockable guide bar, each movable relatively to the platform, said actuating bar being operable to shift an article from the conveyor to said shiftable platform.

In witness whereof I affix my signature.

FRED W. DANBERG.